United States Patent

Economopoulos et al.

[15] 3,636,377

[45] Jan. 18, 1972

[54] BIPOLAR SEMICONDUCTOR RANDOM ACCESS MEMORY

[72] Inventors: Panayotis C. Economopoulos, Scottsdale; Thomas W. Hart, Jr., Phoenix, both of Ariz.

[73] Assignee: Semi-Conductor Electronic Memories Incorporated, Phoenix, Ariz.

[22] Filed: July 21, 1970

[21] Appl. No.: 56,778

[52] U.S. Cl. ................................307/238, 307/291, 340/173

[51] Int. Cl. ....................................G11c 11/36, H03k 3/286

[58] Field of Search ...................307/238, 291, 279; 340/173

[56] References Cited

UNITED STATES PATENTS 3,537,078 10/1970 Pomeranz..............................340/173

*Primary Examiner*—Stanley T. Krawczewicz

*Attorney*—Lindenberg, Freilich & Wasserman

[57] ABSTRACT

A bipolar semiconductor random access memory (RAM) cell is provided, suitable for use in the form of memory arrays fabricated as an integrated circuit. The storage transistors employed are well isolated from the addressing portion of the circuitry so as not to be affected thereby. The cell operates in three modes of power dissipation comprising very low power when it is in the unselected mode, slightly higher power when half selected, and the highest power dissipation when in the fully selected mode.

20 Claims, 6 Drawing Figures

PANAYOTIS C. ECONOMOPOULOS
THOMAS W. HART, JR.
INVENTORS

BY
Lindenberg Freilich & Wasserman
ATTORNEYS

PATENTED JAN 18 1972 3,636,377

INVENTORS
PANAYOTIS C. ECONOMOPOULOS
THOMAS W. HART, JR.
BY
Lindenberg Freilich & Wasserman
ATTORNEYS

PANAYOTIS C. ECONOMOPOULOS
THOMAS W. HART, JR.
INVENTORS

BY
Lindenberg Freilich & Wasserman
ATTORNEYS

PANAYOTIS C. ECONOMOPOULOS
THOMAS W. HART, JR.
INVENTORS

BY
Lindenberg Freilich & Wasserman
ATTORNEYS

BIPOLAR SEMICONDUCTOR RANDOM ACCESS MEMORY

BACKGROUND OF THE INVENTION

1. Field of the Invention

This invention relates to a circuit arrangement suitable for use as a bipolar memory cell which can be fabricated into arrays in the form of an integrated circuit, and more particularly, to improvements therein.

2. Description of the Prior Art

Semiconductor memory arrays are coming into prominence for use as a high-speed memory. The expected speed is generally higher than the speed attainable in a memory using magnetic cores. Semiconductor memories have an additional advantage over core memories in that readout does not erase the stored information, while still providing random access to any stored location. Such memories are called "Ram" for random access memory.

Standby power is required to maintain storage in the semiconductor memory, and many attempts have been made to minimize the amount of this standby power. One does not mind expending power when the memory is being interrogated but other than that it constitutes a waste. Thus, low-power consumption during standby is highly desirable.

Another sought for quality in a semiconductor memory is that the process of interrogation should not alter the information stored in the cell. Also, if it is desired to access a cell to change the information stored therein, this should not only be feasible, but also should be capable of being done simply. Finally, since the selling point of these memories is dependent on low-access time, a system should be provided which provides the fastest access time possible.

OBJECTS AND SUMMARY OF THE INVENTION

An object of the present invention is to provide a novel random access memory semiconductor cell with nondestructive readout capabilities.

Another object is the provision of a semiconductor memory cell which conserves power.

Yet another object of the present invention is the provision of a semiconductor memory cell which provides extremely rapid access time.

A further object of this invention is the provision of a novel, and useful easily fabricated semiconductor memory cell.

The foregoing and other objects of the invention are achieved in a bipolar cell arrangement wherein information storage is in one or the other of two transistors having their collectors and bases cross-connected. One address line hereafter also referred to as the X addressing line is connected to a transistor which is connected in series with the load to both of these transistors. A common emitter load resistor is provided.

The addressing circuitry for the two storage transistors further includes two transistors connected through their collectors to second emitters of the two storage transistors. These addressing transistors have their bases connected through two resistors to a common load resistor. A Y addressing line is connected through circuitry including two further transistors to this common base load resistor to increase the voltage thereacross in the process of addressing the cell.

Output from the cell is derived across two resistors, which are respectively connected to the emitters of the two addressing transistors.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
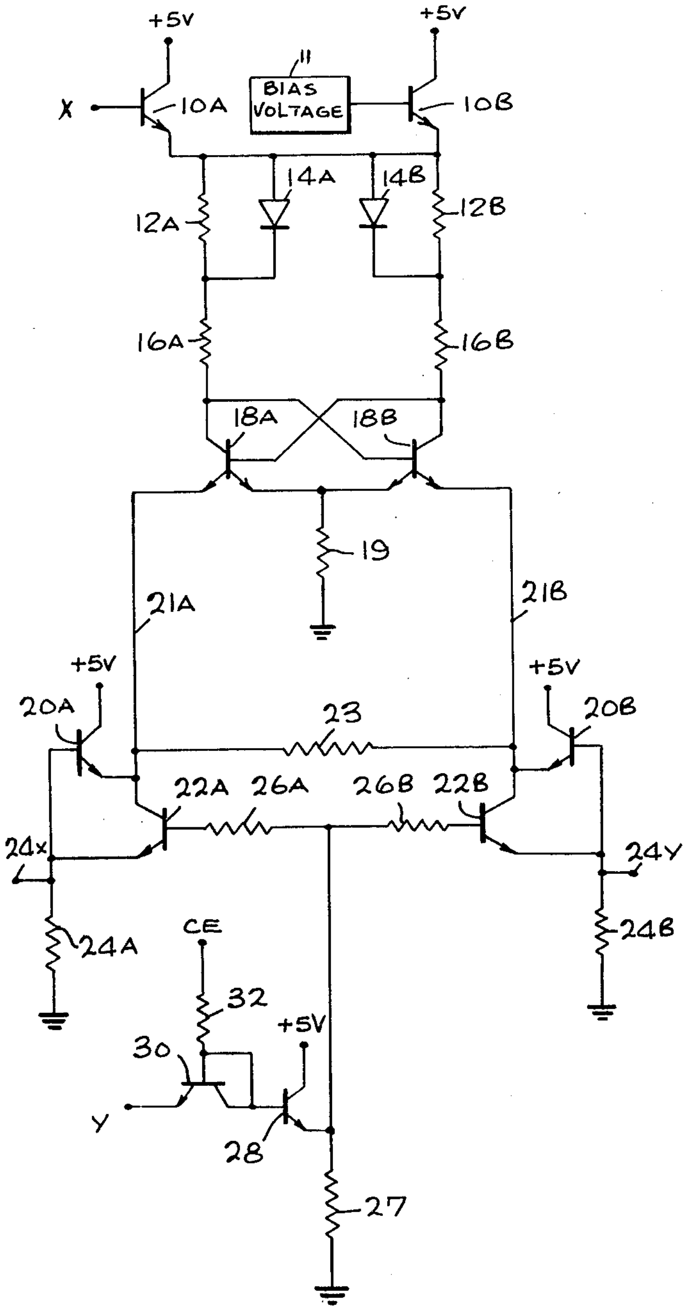
FIG. 1 is a basic schematic diagram of the cell arrangement of the present invention, and associated circuitry.
Figure 3A:
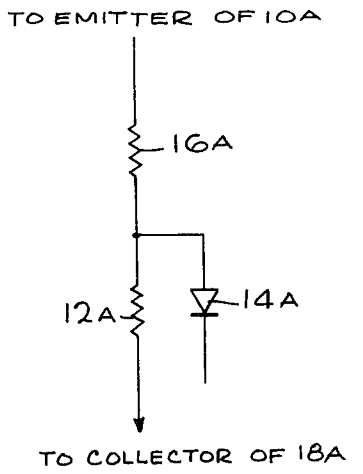
FIG. 3*a* and 3*b* are partial schematic diagrams of possible modifications in the arrangement shown in FIG. 1.
Figure 3B:
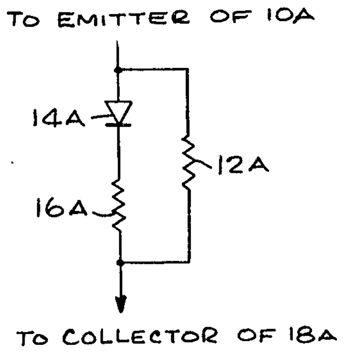

A circuit arrangement in accordance with this invention is shown in FIG. 1. The circuit is substantially bilateral. A pair of first transistors 10A and 10B respectively have their collectors connected to a positive source of operating potential, and their emitters connected to one end of first resistors respectively 12A and 12B across which are respectively connected diodes 14A and 14B. The base of transistor 10A constitutes an input terminal designated as X, which is connected to an X addressing line. The other transistor, 10B, has its base connected to a source of bias voltage 11.

Resistors 12A and 12B have their other ends respectively connected to resistors 16A and 16B. The other ends of the resistors 16A and 16B are connected to the collectors of two storage transistors respectively 18A and 18B.

The collector of transistor 18A is connected to the base of transistor 18B and the collector of transistor 18B is connected to the base of transistor 18A. It should be noted that the two transistors 18A and 18B are of the type which have multiple emitters, two being shown.

One emitter of the transistors 18A and 18B is connected to a common emitter load resistor 19, the other end of which is connected to ground. The other emitters of the respective transistors 18A and 18B are connected to the respective emitters of transistors 20A and 20B and to the respective collectors of transistors 22A and 22B, by means of lines 21A and 21B respectively. These lines may hereafter be referred to as the sense lines. A resistor 23 is connected between lines 21A and 21B. Its function will be discussed hereafter in some detail.

Transistors 20A and 20B have their respective collectors connected to a positive operating potential source, and their respective bases connected to one end of the respective resistors 24A and 24B. The emitters of transistors 22A and 22B are also connected to this one end of the resistors 24A and 24B. The other ends of these resistors 24A and 24B are connected to ground. The one ends of the resistors 24A and 24B constitute the sense output terminals.

The bases of the respective transistors 22A and 22B are respectively connected through resistors 26A and 26B to a common load resistor 27, the other end of which is connected to ground. A transistor 28, has its emitter connected to the junction of resistors 26A and 26B with resistor 27. The collector of this transistor is connected to a positive operating potential source. The base of this transistor is connected to the collector of another transistor 30. The base of this transistor is connected to its collector and to another resistor 32. Resistor 32 is connected to a terminal designated CE (chip enable), at which an appropriate potential is applied depending on the mode of operation. The emitter of transistor 30 is used as the second required terminal for addressing the bipolar cell. This emitter has as its designation, Y, since it is assumed to be connected to the Y address line of a memory.

In FIG. 1, transistors 10A and 10B can be thought of as the X driver for the bipolar cell which consists of transistors 18A and 18B, diodes 14A and 14B and resistors 12A, 12B, 16A, 16B and 19. Transistors 20A, 20B, 22A and 22B together with resistors 23, 26A and 26B can be thought of as a sense-write (S/W) unit for the cell, while transistors 28 and 30 and resistor 32 define a cell Y driver. For explanatory purposes resistors 24A and 24B can be thought of as resistors connected between ground and the inputs of a differential sense amplifier (not shown) to which terminals 24X and 24Y are connected.

Storage of the information in the cell is a function of the states of conduction of transistors 18A and 18B. For explanatory purposes it can be assumed that a binary 1 is stored in the cell when one of the two transistors, e.g., 18A is on, and 18B is off, while a 0 is stored when 18A is off and 18B is on. The resistor 19 is a degenerative resistor which serves to reduce the power dissipation required while providing a current return path when the cell is not selected. Isolation is provided because in the unselected mode (X line is not selected) the second emitters connected to the sense lines provide isolation for any positive voltage variations on the sense lines. In the half selected mode in which X is selected, isolation of the cell is provided by the fact that 22A and 22B are turned off. Because of this isolation, more of these memory cells can be tied together without degradation in performance.

It will be shown that whenever the memory cell is fully addressed, there is an order of magnitude increase in the current drawn by the cell from the unselected to the fully selected case. This simplifies the design of the external sense amplifier required to be used by a tremendous factor, and also provides for fast access time.

For the purposes of describing the operation of this invention, assume that transistor 10B is conductive, by reason of the application of the bias voltage 11, for example, 2 volts to the base thereof, which is enough to maintain transistor 18A also conductive, representing one of the two stable states of the memory cell. Transistors 10A and 18B and all the other transistors in the circuit are assumed to be cut off or simply off.

In the one-half selected mode, a positive potential such as 3.5 V is applied to the X terminal, and the Y and CE terminals are held at 0 V. The positive potential at the X terminal turns on transistor 10A which raises the voltage at the emitter of transistor 10A to a value at which both diode 14A and 14B are sufficiently forward biased to become conductive. Thus, they bypass additional current around the parallel connected resistors 12A and 12B, whereby the current available is increased. Alternately stated, in the one-half selected mode, the raised voltage at the emitter of transistor 10A effectively reduces the collector resistors of transistors 18A and 18B by forward biasing diodes D1 and D2, thereby increasing the collector current of transistor 18A which is assumed to be on.

This increased current flows to ground through transistor 18A which is on and resistor 19. However, no sense current flows through the sense lines connecting transistors 18A and 18B to transistors 22A and 22B and to the output terminals, since neither transistor 22A nor 22B becomes conductive unless transistor 28 is rendered conductive. The bases of transistors 22A and 22B are essentially at ground potential at this time.

In the fully selected mode in addition to the positive (3.5 V) potential at terminal X the potentials at terminals Y and CE are also positive, e.g., 3.5 V. Consequently, transistor 28 is turned on. This causes a positive potential to be placed at the junction of resistors 26A, 26B and 27 and therethrough to the bases of transistors 22A and 22B, whereby they are both driven into saturation or on. As a result their collector potentials drop to a low value, e.g., 0.4 volt and therefore most of the collector current of transistor 18A flows through the emitter which is connected to the collector 22A. This current continues to flow through transistor 22A and through resistor 24A to ground. Accordingly, an output potential will be sensed at the output terminal 24X connected to resistor 24A due to the cell current and resistor 26A current. A smaller voltage output is sensed at the output terminal 24Y connected to resistor 24B since transistor 18B is cut off and only the current through resistor 26B is flowing. This differential voltage can be amplified and used for whatever purpose it is desired.

If it is desired to write into the cell, for example, turn off transistor 18A and turn on transistor 18B, it is first necessary to address the X and Y terminals as in the fully selected mode and terminal CE is also at the positive potential. At the same time, a positive pulse is applied to the base of transistor 20A. In some cases the base of transistor 20B may have to be grounded through a saturated transistor (not shown) as will be explained hereafter. When the base of transistor 20A goes positive, transistor 22A is cut off. The sense line, connecting the collector of transistor 22A and the emitter of transistor 20A to the emitter of transistor 18A, and the potential of collector of 18A rises since the emitter current of 18A is now diverted to the relatively high impedance of resistor 19. When the potential of collector 18A reaches a sufficiently high value, e.g., 1.2 volts, it forward biases the base of 18B, since its emitter is held near ground through transistor 22B which is on. At this point 18B turns on, removing the forward bias at the based of 18A. Consequently, 18A is cut off completely. This condition will prevail through the subsequent addressing operations. It can only be changed by rendering transistor 20B conductive while addressing the X and Y and CE input terminals.

The function of resistor 23 is to insure that no destructive readout problems can occur even with large unbalances on the sense lines 21A and 21B to which it is connected. This occurs by reason of the fact that the resistor provides an alternate path to the current flow whereby a blocking voltage buildup is prevented. The significance of the presence of the resistor 23 may be appreciated by considering the following example. Let it be assumed that transistor 18A is on, that the cell is switching into the full select mode and that due to some imbalance in the Y driver, or the external voltage at 24X or 24Y, transistor 22B turns on before transistor 22A. In such a case the voltage at the collector of 18A may reach a value sufficient to turn on 18B which will result in the turn off of 18A, before 22A turns on. However, by incorporating resistor 23, which is generally in the order of a few hundred ohms, destructive readout is eliminated since it effectively connects line 21A to ground through transistor 22B which may be on even before transistor 22A turns on. This example also holds true during unselection of the cell.

The presence of resistor 23 may require the grounding of one of the output terminals, when a positive voltage is applied to the other output terminal for write purposes. For example, when transistor 18A is on and it is desired to write a 0 in the cell, as previously pointed out, a positive voltage is applied to terminal 24X to turn on transistor 20A (while transistor 22B is on) thereby raising the voltage on line 21A toward +5V. The voltage at the collector of transistor 18A rises and as a result transistor 18B, whose emitter is effectively coupled to ground through transistor 22B and resistor 24B, turns on, in turn turning off transistor 18A. For transistor 18B to turn on it is important that its emitter be at or near ground. With the presence of resistor 23 this may be accomplished by grounding terminal 24Y. Alternately, the values of resistors 23, 24A and 24B may be chosen by increasing the resistance of resistor 23 and selecting small resistors 24A and 24B so that even though line 21A is at about +5V, the voltage drops across resistor 23 and 24B are such that line 21B is sufficiently close to ground to insure the proper turn on of transistor 18B.

There has accordingly been herein described and shown a novel and useful bipolar RAM cell which is economical as far as power usage is concerned, is simple to fabricate and can provide high speed access time. This cell can be used in a large matrix sharing common X lines in one direction and common sense lines in the Y direction. Such a matrix is shown in FIG. 2 to which reference is now made.

Figure 2:
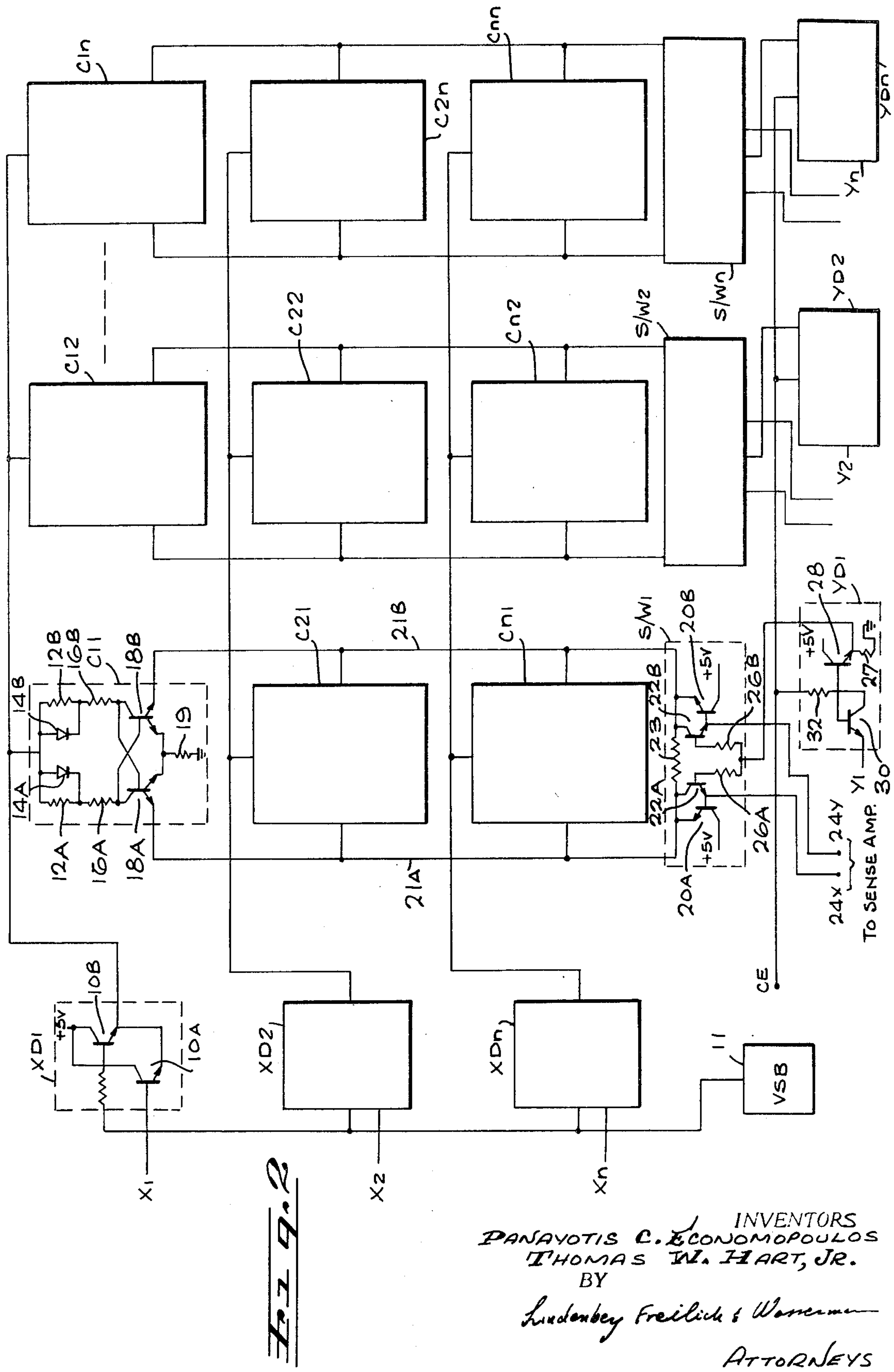
FIG. 2 is a combination block and schematic diagram of an array of the novel cells arranged in a matrix of rows and columns.

In FIG. 2, a plurality of cells are arranged in an array in the form of a matrix of *n* rows R1–R*n* and columns C1–C*n*. Each cell is designated by the letter C followed by a first number or letter designating its row and a second number or letter designating the cell's column. As shown, a single X driver is provided for each row of columns. The X drivers are designated XD1–XD*n*. A single sense/write (S/W) unit is associated with each column of cells, the units being designated S/W1–S/W*n*. Each column also includes a Y driver, these drivers being designated by YD1–YD*n*. In FIG. 2, elements like those shown in FIG. 1 are designated by like numerals.

The array, shown in FIG. 2, is assumed to be mounted on a single chip, with a complete memory being assumed to comprise a plurality of such chips, each with an identical array arrangement. As seen from FIG. 2, all the Y drivers are connected to a common CE (chip enable) terminal. Thus, the address of any cell in the memory is defined by its row, column and the chip on which it is mounted.

Figure 4:
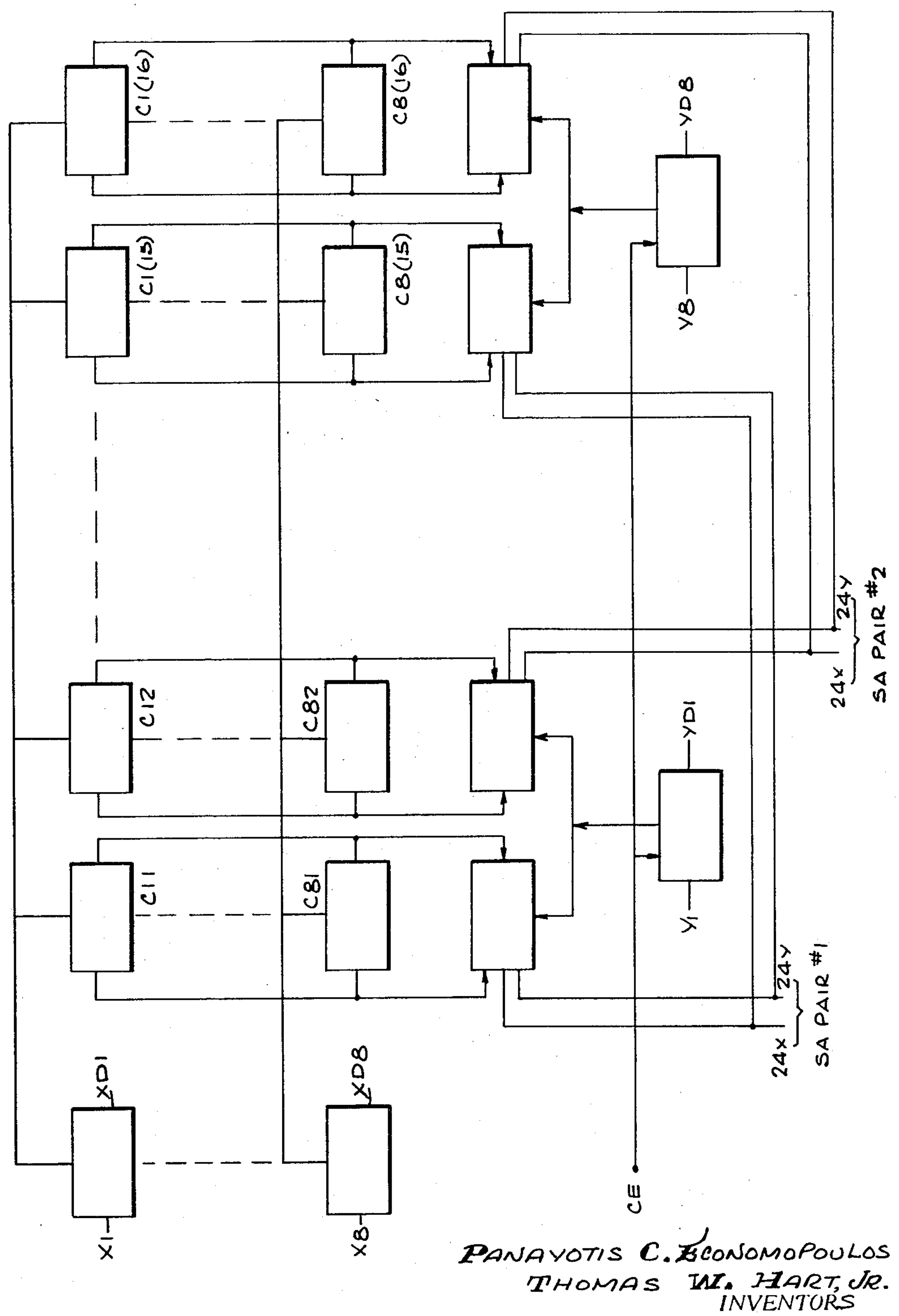
FIGS. 4 and 5 are organization diagrams of a 128×2 bit memory which was actually reduced to practice.
Figure 5:
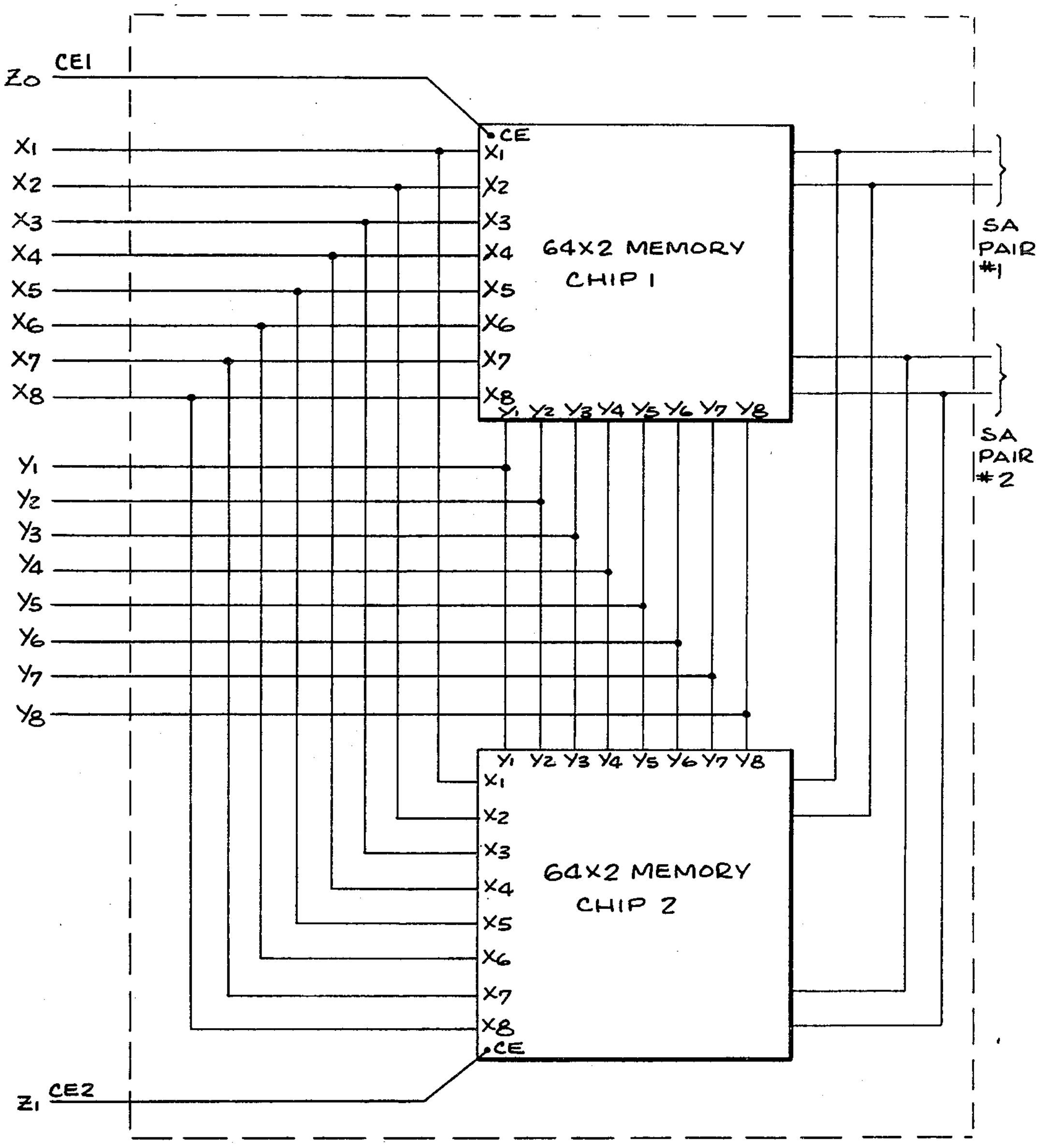

It should be appreciated that various modifications may be made in the arrangements as shown without departing from the true spirit of the invention. For example, in the basic cell arrangements, different from those shown in FIG. 1, may be used to vary the collector resistors of transistors 18A and 18B from a high value in the standby mode to a lower value in the half select mode. Two such arrangements are shown in FIGS. *3a* and *3b*, wherein elements like those shown in FIG. 1 are designated by like reference numerals. In FIG. 2 each column of cells is shown associated with a separate Y driver. In one embodiment actually reduced to practice, the teachings were employed to form a memory of 128 two-bit words. The memory was actually formed on two chips, each with an array of cells in 8 rows and 16 columns. A separate Y driver was used for each pair of columns. Consequently, any two-bit word could be addressed by addressing the word's X line, Y line and chip number. The organization on each chip comprising a 64×2 bit bipolar memory array is diagrammed in FIG. 4, while FIG. 5 represents the complete memory organization, wherein the X, Y and sense pairs of the two chips are shown bussed together. It should be apparent that when a word is addressed, both bits are simultaneously readout on the two sense pairs designated SA pair No. 1 and SA pair No. 2 which are assumed to be connected to two separate sense amplifiers.

It is appreciated that modifications and/or equivalents can be made in the arrangements as shown without departing from the spirit of the invention. For example, the X and Y lines can be interchanged, as well as sense line pairs, on two or more different chips of a memory system. Such interchangeability greatly simplifies interconnection requirements. Therefore, all such modifications and/or equivalents fall within the scope of the invention as defined in the appended claims.

What is claimed is:

1. A bipolar semiconductor cell comprising:

first and second transistors each having base and collector electrodes and first and second emitter electrodes, each transistor being switchable between on and off states of conduction;

first means for connecting the first transistor collector and base to the second transistor base and collector respectively;

a first resistor;

means connecting said first resistor between a first reference potential and the first emitters of said first and second transistors;

first and second collector resistor means connected between the first and second transistor collectors respectively and a junction point at which a first potential is applied during a first mode of operation of said cell whereby when said first transistor is in its on state and said second transistor is in its off state the first collector resistor means controls the resistance between the first transistor collector and said junction point to be of a first value, said junction point being adapted to respond to a second potential higher than said first potential during a second mode of operation of said cell with said first collector resistor means being responsive to said second potential for controlling the resistance between said junction point and said first transistor collector to be of a second value lower than said first value; and cell sense and write means connected to the second emitters of said first and second transistors and responsive to control signals for sensing or reversing the states of conduction of said first and second transistors, said cell sense and write means including a control resistor connected between the second emitters of said first and second transistors.

2. The arrangement as recited in claim 1 wherein each of said first and second collector resistor means comprises at least one resistor and one diode connected in series between said junction point and the collector of one of said first and second transistors, with said diode becoming substantially fully forward biased when said second potential is applied at said junction point.

3. The arrangement as recited in claim 2 wherein each collector resistor means includes a second resistor connected in parallel at least across said diode.

4. The arrangement as recited in claim 3 wherein said second resistor of each collector resistor means is connected in parallel only across said diode.

5. The arrangement as recited in claim 3 wherein said second resistor of said collector resistor means is connected in parallel across the series combination of the other resistor and said diode.

6. A semiconductor circuit comprising:

first and second transistors each having base and collector electrodes and first and second emitter electrodes, each transistor being switchable between on and off states of conduction;

first means for connecting the first transistor collector and base to the second transistor base and collector respectively;

a first resistor;

means connecting said first resistor between a first reference potential and the first emitters of said first and second transistors;

first and second resistance control means respectively connected between said first and second transistor collectors and a junction point for controlling the resistances between said junction point and the first and second transistors as a function of a first potential which is applied to said junction point when one of said transistors is in its on state and the other is in the off state, and a second potential higher than said first potential;

first drive means coupled to said junction point for applying said first and second potentials to said junction point when said first drive means is operable in first and second modes, respectively;

second drive means responsive to an enabling signal for providing an enabling output signal;

a feedback resistor connected between the second emitters of said first and second transistors; and sense means coupled to the second emitters of said first and second transistors and to said second drive means and responsive to the enabling output signal of said second drive means for providing a potential difference across first and second output terminals of said sense means, with the polarity of said potential difference being a function of the states of conduction of said first and second transistors.

7. The arrangement as recited in claim 6 wherein said first resistance control means includes a first resistor and a diode connected in series between said junction point and said first transistor collector and a second resistor connected in parallel across at least said diode, said diode becoming substantially fully forward biased when said second potential is applied at said junction point and said first transistor is in the on state whereby the resistance between said junction point and the first transistor is of a first value when said first potential is applied to said junction point and is of a second value lower than said first value when said second potential is applied at said junction point, and wherein said second resistance control means includes a first resistor and a diode connected in series between said junction point and said second transistor collector and a second resistor connected in parallel across at least said diode, said diode becoming substantially fully forward biased when said second potential is applied at said junction point and said second transistor is in the on state, whereby the resistance between said junction point and said second transistor is of a first value when said first potential is applied to said junction point and is of a second value lower than said first value when said second potential is applied at said junction point.

8. The arrangement as recited in claim 6 wherein said sense means include third and fourth transistors each with base emitter and collector electrodes, means for connecting second emitters of said first and second transistors to the third and fourth transistor collectors respectively, means for connecting the third and fourth transistor emitters to the first and second output terminals respectively of said pair of output terminals, first and second base resistors connected in series between the bases of said third and fourth transistors, means connecting the second drive means to said sense means at the junction point of said first and second base transistors whereby the application of the enabling output signal of said second drive means at the junction point of said first and second base resistors switches said third and fourth transistors to their on state.

9. The arrangement as recited in claim 8 wherein said second drive means includes a fifth transistor with base, emitter and collector electrodes, means connecting said fifth transistor collector to a third reference potential, means connecting said fifth transistor emitter to said first reference potential, a pair of input terminals and input control means including a semiconductor element connected between said pair of input terminals and said fifth transistor base for switching said fifth transistor to its on state to provide said enabling output signal to said sense means only when enabling signals are coincidentally applied to said pair of input terminals.

10. The arrangement as recited in claim 9 wherein said input control means include a sixth transistor having its emitter connected to a first of said pair of input terminals, with its base and collector directly connected to the base of said fifth transistor and a resistor connected between the fifth transistor base and the second of said pair of input terminals.

11. The arrangement as recited in claim 9 further including sixth and seventh transistors each with base, emitter and collector electrodes, means connecting the sixth transistor base and emitter to the third transistor emitter and collector respectively, means connecting the seventh transistor base and emitter to the fourth transistor emitter and collector respectively and means for connecting the collectors of said sixth and seventh transistors to said third reference potential.

12. A bipolar semiconductor cell comprising:

first and second transistors each having base and collector electrodes and first and second emitter electrodes each transistor being switchable between on and off states;

first means connecting the first transistor base to the second transistor collector and the first transistor collector to the second transistor base;

a first resistor;

second means for connecting one end of said first resistor to a reference potential and the other resistor end to the first emitter electrode of each of said first and second transistors;

third means connected to the collectors of said first and second transistors for controlling the collector currents of said first and second transistors, with one of said transistors being in the on state and the other transistor being in the off state; and fourth means connected to the second emitter electrodes of said first and second transistors for sensing the state of one of said first and second transistors, said fourth means including a resistor connected between the second emitter electrodes of said first and second transistors.

13. A bipolar semiconductor cell comprising:

first and second transistors each having base and collector electrodes and first and second emitter electrodes each transistor being switchable between on and off states;

first means connecting the first transistor base to the second transistor collector and the first transistor collector to the second transistor base;

a first resistor;

second means for connecting one end of said first resistor to a reference potential and the other resistor end to the first emitter electrode of each of said first and second transistors;

third means connected to the collectors of said first and second transistors for controlling the collector currents of said first and second transistors, with one of said transistors being in the on state and the other transistor being in the off state; and fourth means connected to the second emitter electrodes of said first and second transistors for sensing the state of one of said first and second transistors, said third means including control means responsive to a first cell addressing signal for controlling the collector current of the transistor of said first and second transistors which is in the one state, and said fourth means including third and fourth transistors each having base, emitter and collector electrodes, means connecting said third transistor collector to the first transistor second emitter, a second resistor, means connecting said second resistor between said first reference potential and said third transistor emitter; means connecting said fourth transistor collector to the second emitter of said second transistor, a third resistor, means connecting said third resistor between said first reference potential and said fourth transistor emitter, and third and fourth transistor control means responsive to at least a second cell addressing signal for switching each of said third and fourth transistors to its on state whereby the potentials across said second and third resistors are indicative of the states of said first and second transistors.

14. A bipolar semiconductor cell as recited in claim 13 further including first and second write control means, means for connecting said first write control means to said first and third transistors and said second write control means to said second and fourth transistors, whereby when said third and fourth transistors are in their on state in response to a first write signal applied to said first write control means, said third transistor is driven to its off state so as to drive said first transistor to its off state and said second transistor to its on state and in response to a second write signal applied to said second write control means, said fourth transistor is driven to its off state so as to drive said second transistor to its off state and said first transistor to its on state.

15. A bipolar semiconductor cell as recited in claim 13 further including a fourth resistor connected between the collectors of said third and fourth transistors.

16. A bipolar semiconductor cell as recited in claim 14 wherein said first write control means comprises a fifth transistor with base, emitter and collector electrodes, means connecting the fifth transistor base and emitter to the third transistor emitter and collector respectively, and means connecting said fifth transistor collector to a second reference potential, said second write control means including a sixth transistor with base, emitter and collector electrodes, means connecting the sixth transistor base and emitter to said fourth transistor emitter and collector, respectively, and means connecting the sixth transistor collector to said second reference potential, whereby when said first, third and fourth transistors are in their on state the application of said first set of write signals to the bases of said fifth and sixth transistors switch said fifth and sixth transistors to their on and off states respectively, thereby switching said third transistor from its on to its off state so as to control the collector current of said first transistor to forward bias the base of said second transistor, whereby said second transistor is switched to its on state and said first transistor is switched to its off state.

17. A bipolar semiconductor cell as recited in claim 16 further including a fourth resistor connected between the collectors of said third and fourth transistors.

18. A bipolar semiconductor cell as recited in claim 14 wherein said third means comprises a potential control transistor with base, emitter and collector electrodes, means connecting said potential control transistor collector to a second source of reference potential, fifth, sixth, seventh and eighth resistors, means connecting said fifth and sixth resistors in series between said first transistor collector and the emitter of said potential control transistor, means connecting said seventh and eighth resistors in series between said second transistor collector and the emitter of said potential control transistor, and means for applying a bias potential to the base of said potential control transistor to switch said potential control transistor to its on state to provide collector current to the collectors of said first and second transistors, said third means further including first and second diodes connected across said sixth and eighth resistors respectively, and means responsive to said first addressing signal for forward biasing said first and second diodes.

19. A bipolar semiconductor cell as recited in claim 18 wherein said first write control means comprises a fifth transistor with base, emitter and collector electrodes, means connecting the fifth transistor base and emitter to the third transistor emitter and collector respectively, and means connecting said fifth transistor collector to a second reference potential, said second write control means including a sixth transistor with base, emitter and collector electrodes, means connecting the sixth transistor base and emitter to said fourth transistor emitter and collector, respectively, and means connecting the sixth transistor collector to said second reference potential, whereby when said first, third and fourth transistors are in their on state, the application of said first set of write signals to the bases of said fifth and sixth transistors switch said fifth and sixth transistors to their on and off states respectively, thereby switching said third transistor from its on to its off state so as to control the collector current of said first transistor to forward bias the base of said second transistor, whereby said second transistor is switched to its on state and said first transistor is switched to its off state.

20. A bipolar semiconductor cell as recited in claim 19 further including a fourth resistor connected between the collectors of said third and fourth transistors.

* * * * *